United States Patent
Fujii et al.

(10) Patent No.: US 10,981,504 B2
(45) Date of Patent: Apr. 20, 2021

(54) VEHICLE BACK DOOR AND VEHICLE WARNING METHOD AND SYSTEM

(71) Applicant: MAZDA MOTOR CORPORATION, Hiroshima (JP)

(72) Inventors: Kazuto Fujii, Hiroshima (JP); Hirofumi Saka, Higashihiroshima (JP); Naohiro Sera, Hiroshima (JP); Kenta Ako, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 100 days.

(21) Appl. No.: 16/419,752

(22) Filed: May 22, 2019

(65) Prior Publication Data
US 2019/0359130 A1 Nov. 28, 2019

(30) Foreign Application Priority Data
May 23, 2018 (JP) .............................. JP2018-099034

(51) Int. Cl.
*B60R 19/34* (2006.01)
*B60Q 9/00* (2006.01)
*B60J 5/10* (2006.01)
*B60R 11/02* (2006.01)

(52) U.S. Cl.
CPC ............... *B60Q 9/008* (2013.01); *B60J 5/10* (2013.01); *B60R 11/0217* (2013.01)

(58) Field of Classification Search
CPC ......... Y10T 292/1047; Y10T 292/1082; B60R 2021/0006; B60R 21/207; B29C 66/71; B60N 2/2806; E05Y 2900/531; E05B 81/06; E05B 77/26
See application file for complete search history.

(56) References Cited

U.S. PATENT DOCUMENTS

| 5,225,639 A | 7/1993 | Kobayashi et al. |
| 8,126,187 B2 * | 2/2012 | Ludwig ............... B60R 11/0217 |
| | | 381/389 |

(Continued)

FOREIGN PATENT DOCUMENTS

| CN | 106170122 A | 11/2016 |
| CN | 206004897 U | 3/2017 |

(Continued)

OTHER PUBLICATIONS

The extended European search report issued by the European Patent Office dated Jul. 19, 2019, which corresponds to European Patent Application No. 19174843.3-1132 and is related to U.S. Appl. No. 16/419,752.

*Primary Examiner* — Kiran B Patel
(74) *Attorney, Agent, or Firm* — Studebaker & Brackett PC

(57) ABSTRACT

A vehicle back door includes a back door main body having a window opening and a back door pane attached to the window opening. The back door main body has a speaker. The speaker is disposed below the back door pane and the angle α1 formed by a vehicle height direction axis and a central axis of the speaker is set to a value smaller than the inclination angle α2 of the back door pane with respect to the vehicle height direction axis. The sound emitted by the speaker is reflected by the back door pane and then transmitted to the front part of the vehicle interior.

12 Claims, 5 Drawing Sheets

(56) References Cited

U.S. PATENT DOCUMENTS

| | | | | |
|---|---|---|---|---|
| 8,526,661 | B2 * | 9/2013 | Newberg | H04R 1/025 |
| | | | | 381/387 |
| 9,463,685 | B2 * | 10/2016 | Barrow | B60R 13/0243 |
| 10,046,624 | B2 * | 8/2018 | Motohashi | B60J 5/107 |
| 10,195,927 | B2 * | 2/2019 | Dockweiler | E05F 15/60 |
| 2007/0080264 | A1 * | 4/2007 | Kukucka | H04R 5/02 |
| | | | | 248/27.1 |
| 2016/0176271 | A1 * | 6/2016 | Rejc | B22D 17/00 |
| | | | | 296/146.5 |
| 2016/0176272 | A1 * | 6/2016 | Rejc | B60L 9/00 |
| | | | | 296/146.5 |
| 2016/0345115 | A1 | 11/2016 | Paik | |

FOREIGN PATENT DOCUMENTS

| | | |
|---|---|---|
| JP | 2000-177512 A | 6/2000 |
| WO | 2006053548 A2 | 5/2006 |

* cited by examiner

VEHICLE BACK DOOR AND VEHICLE WARNING METHOD AND SYSTEM

BACKGROUND

The present application relates to a vehicle back door and a vehicle warning method and system.

Japanese Patent Laid-Open publication No. 2000-177512 discloses an assist system that emits a warning sound via a speaker provided near a driver seat if a sensor provided in the rear part of a vehicle detects an obstacle behind the vehicle when the gear shift lever of the vehicle is set in reverse.

More practically, when the presence of an obstacle at rear of the vehicle is alerted, an alarm sound is emitted, for example, from the rear portion of the vehicle interior. This is because the occupant, such as the driver in the front seat is likely to intuitively understand the presence of danger of collision from behind. However, when the speaker is provided in the rear portion of the vehicle, a warning sound emitted from the speaker is absorbed by, for example, the rear seat, the sound pressure that reaches the driver becomes smaller, and the decision by the driver may be delayed.

SUMMARY

Accordingly, an object of the present application is to provide a vehicle back door device and a vehicle warning method and system that have a warning speaker disposed in a back door and can transmit as loud a warning sound as possible to the front part of the vehicle interior.

To achieve this object, a vehicle back door according to an embodiment of a first aspect includes a back door main body having a window opening formed therein; a back door pane attached to the back door main body to close the window opening; and
a speaker attached to the back door main body at a position below the back door pane, in which an angle formed by a vehicle height direction of a vehicle and a central axis of the speaker is smaller than an inclination angle of the back door pane with respect to the vehicle height direction.

In the vehicle back door according to the embodiment of the first aspect, the sound emitted by the speaker is reflected by the back door pane and transmitted to the front part of the vehicle interior. Accordingly, the driver recognizes the sound emitted by the speaker as the sound transmitted from the rear part and recognizes the presence of a rear obstacle.

A vehicle back door according to an embodiment of a second aspect includes a back door main body having a window opening formed therein; a back door pane attached to the back door main body to close the window opening; and a speaker attached to the back door main body at a position below the back door pane, in which a central axis of the speaker is oriented to the back door pane.

In the vehicle back door according to the embodiment of the second aspect, the sound emitted by the speaker is reflected by the back door pane and transmitted to the front part of the vehicle interior. Accordingly, the driver recognizes the sound emitted by the speaker as the sound transmitted from the rear part and recognizes the presence of a rear obstacle.

In the vehicle back door according to an embodiment of a third aspect, the speaker is disposed in a central portion in a vehicle width direction of the back door main body. In the vehicle back door according to an embodiment of a fourth aspect, another speaker is also disposed in the back door main body, and the speakers are disposed in plural spaced apart from each other in a vehicle width direction with a central portion of the back door main body being positioned between the speakers in the vehicle width direction.

In the vehicle back doors according to the embodiments of the third and fourth aspects, the disposition of the speakers may be changed depending on the structure of the form of the vehicle.

In the vehicle back door according to an embodiment of a fifth aspect, a sound reflected by the back door pane is oriented upward of a horizontal plane.

In the vehicle back door according to the embodiment of the fifth aspect, the sound reflected by the back door pane can be transmitted to the front part through the rear seat. Accordingly, the driver can surely recognize the sound transmitted from the rear part.

A vehicle warning system according to an embodiment of a sixth aspect includes a sensor that detects an obstacle behind a vehicle; and a controller electrically connected to the sensor and a speaker disposed in a vehicle interior of the vehicle, in which the controller is configured to drive the speaker to emit a warning sound when the sensor detects the obstacle behind the vehicle, and in which a central axis of the speaker is oriented to a rear window pane of the vehicle.

In addition, a vehicle warning method according to an embodiment of a seventh aspect for emitting a warning sound via a speaker when having detected an obstacle behind a vehicle includes a step of detecting the obstacle behind the vehicle; and a step of causing the speaker disposed in a vehicle interior of the vehicle to emit the warning sound when having detected the obstacle, in which the warning sound emitted by the speaker is reflected by a rear window pane of the vehicle and transmitted to a front part of the vehicle interior of the vehicle.

In the vehicle warning system according to the sixth aspect and the vehicle warning method according to the seventh aspect, the sound emitted by the speaker is reflected by the back door pane and transmitted to the front part of the vehicle interior. Accordingly, the driver recognizes the sound emitted by the speaker as the sound transmitted from the rear part and recognizes the presence of a rear obstacle.

Because the sound emitted by the speaker is reflected by the back door pane and transmitted to the front part of the vehicle interior as described above in embodiments of the present application, the driver can recognize the sound emitted by the speaker as the sound transmitted from the rear part and recognize the presence of a rear obstacle.

Other features, aspects, and advantages of the present application will become apparent from the following description which refers to the accompanying drawings.

DETAILED DESCRIPTION

Embodiments of a vehicle back door and a warning system according to the present application will be described below.

(1) Vehicle Back Door

Embodiment 1

Figure 1:
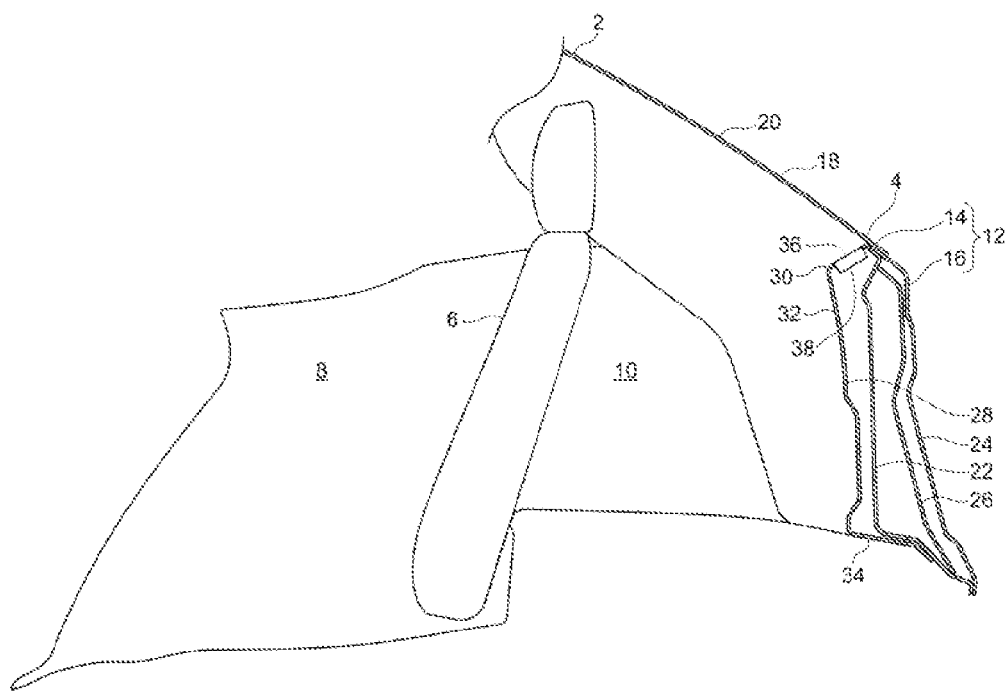
FIG. 1 is a vertical sectional view illustrating a vehicle back door.
Figure 2:
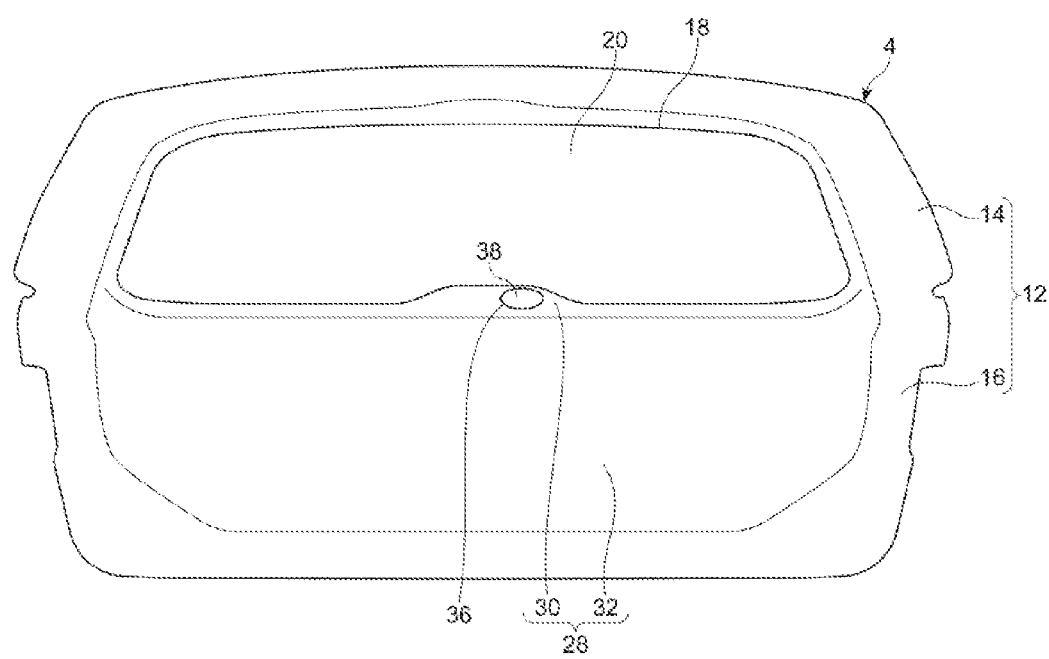
FIG. 2 is a drawing illustrating the structure of a back door main body of the vehicle back door illustrated in FIG. 1, seen from a vehicle interior.

FIGS. 1 and 2 illustrate the rear structure of a vehicle 2, particularly the structure of a liftgate back door 4. A rear seat 6 is disposed in front of the back door 4 and a luggage compartment 10, which constitutes a part of a vehicle interior 8, is formed between the back door 4 and the rear seat 6.

The present application is not limited to a liftgate back door. A liftgate system, a one-way draw system, or a center draw system may be used as the open-close system of the back door 4. The present application is also applicable to a back door of a one-way draw system or a center draw system as well.

In the back door 4 according to this embodiment, the upper end of the back door 4 and a part of the vehicle main body corresponding thereto have a hinge mechanism (not illustrated) and this hinge mechanism enables the back door 4 to be opened or closed like a liftgate with respect to the vehicle main body. In addition, the lower end of the back door 4 and a part of the vehicle main body corresponding thereto have a latch mechanism (not illustrated). This latch mechanism enables the back door 4 to be locked to the vehicle main body.

The back door 4 has a back door main body 12. The back door main body 12 includes a back door main body upper part 14 and a back door main body lower part 16. The back door main body upper part 14 has a window opening 18 and a back door pane or rear window pane 20 is attached to the window opening 18. In this embodiment, the window opening 18 is formed so that the back door pane 20 attached thereto is oriented obliquely upward from the rear to the front. In this embodiment, the back door pane 20 is curved so as to project slightly from the inside to the outside of the vehicle interior 8, as illustrated in FIG. 1.

As illustrated in FIG. 1, the back door main body 12 has an inner panel 22 disposed inside and an outer panel 24 disposed outside. In this embodiment, a stiffening panel 26 is disposed between the inner panel 22 and the outer panel 24 in the back door main body lower part 16. In addition, a back door trim 28 is provided inside the inner panel 22.

The back door trim 28 has an upper horizontal part 30 extending from the vicinity of the window opening 18 toward the front in the vehicle interior 8, a vertical part 32 extending downward from the front end of the upper horizontal part 30, and a lower horizontal part 34 extending backward from the lower end of the vertical part 32. As illustrated in FIG. 1, in this embodiment, the upper horizontal part 30 is inclined obliquely downward to the front from the vicinity of the window opening 18.

An opening 36 is formed near a middle part in the vehicle width direction of the upper horizontal part 30 of the back door trim and a speaker 38 is disposed in the opening 36. The speaker 38 has a cone-shaped or dome-shaped diaphragm and is oriented so that the direction in which the diaphragm vibrates, that is, a central axis 40 of the speaker 38, is disposed obliquely with respect to the back door pane 20, for example, with respect to the inner surface of the back door pane 20. In other words, the speaker 38 is disposed so that the central axis 40 intersects with the inner surface of the back door 20.

Figure 3:
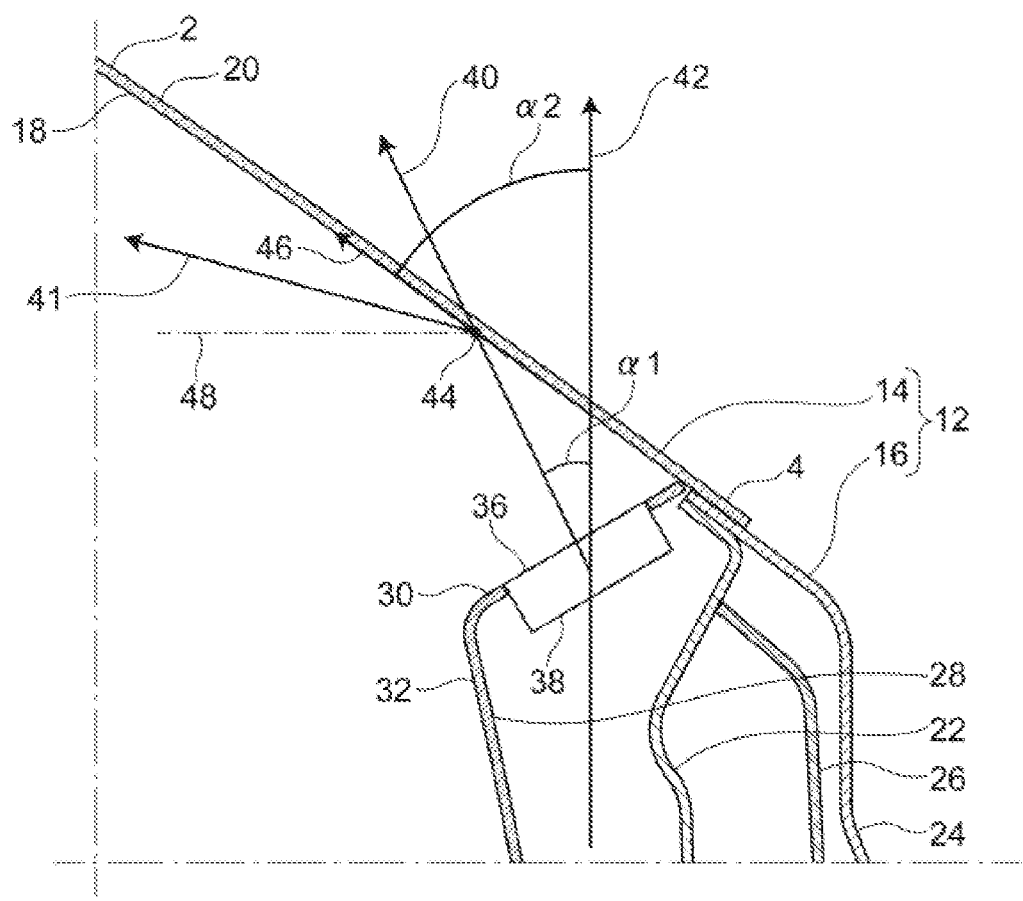
FIG. 3 is a cross sectional view illustrating directions in which the sound emitted by the speaker illustrated in FIGS. 1 and 2 is transmitted.

Detailed description will be given with respect to FIG. 3. In the vertical cross sectional view taken along the vehicle front-rear direction, when the crossing angle between a vehicle height direction axis, being the vertical axis, 42 and the speaker central axis 40 is assumed to be $\alpha1$ and the crossing angle between a back door pane tangent line 46 and the vehicle height direction axis 42 at a point 44 at which the speaker central axis 40 intersects the back door pane 20 is assumed to be $\alpha2$, the speaker 38 is set with respect to the back door pane 20 so that the relationship $\alpha1<\alpha2$ holds.

As for the direction of a sound emitted by the speaker 38, the "direction" of a sound represents the direction of the sound that is transmitted along the speaker central axis 40. When the sound emitted by the speaker 38 is reflected by an object, such as the back door pane 20, and the direction thereof is changed, the sound incident on the object at a certain incident angle along the speaker central axis 40 is reflected at a reflection angle that is identical to the incident angle. In this case, the direction in which the reflected sound is transmitted is referred to as a speaker central axis 41.

In this embodiment, for example, $\alpha1$ is set to 27 degrees and $\alpha2$ is set to 57 degrees. Accordingly, the sound emitted by the speaker 38, especially a part having the maximum sound pressure of the sound transmitted along the central axis 40, is incident on the back door pane 20 and then transmitted to the front at an elevation angle of +3 degrees with respect to a horizontal plane 48. As a result, the reflected sound is transmitted over the rear seat 6 to the front part along the speaker central axis 41. Accordingly, the driver in the front part of the vehicle interior 8 can clearly recognize the sound transmitted from the rear part of the vehicle.

In this embodiment, the speaker 38 may be supported by a bracket that supports a rear wiper driving motor. Description will be given below with reference to FIG. 4. A bracket 50 is fixed to the inner panel 22 by fasteners such as bolts at three fastening points 52, 54, and 56. In this embodiment, the bracket 50 is fixed to the inner panel 22 at the left and right fastening points 52 and 54 positioned on both sides in the vehicle width direction of a wiper driving shaft 58 and at the middle fastening point 56 positioned between the left and right fastening points 52 and 54. The bracket 50 has a motor unit 60 that drives a wiper (not illustrated). The motor unit 60 includes a motor 62 and a reducer 64, for example, a gear assembly, and an output of the reducer 64 is transmitted to the wiper driving shaft 58. The wiper driving shaft 58 penetrates through the back door 4 or the back door pane 20 and projects to an outside of the vehicle interior and the wiper (not illustrated) is fixed to the wiper driving shaft 58.

Figure 4:
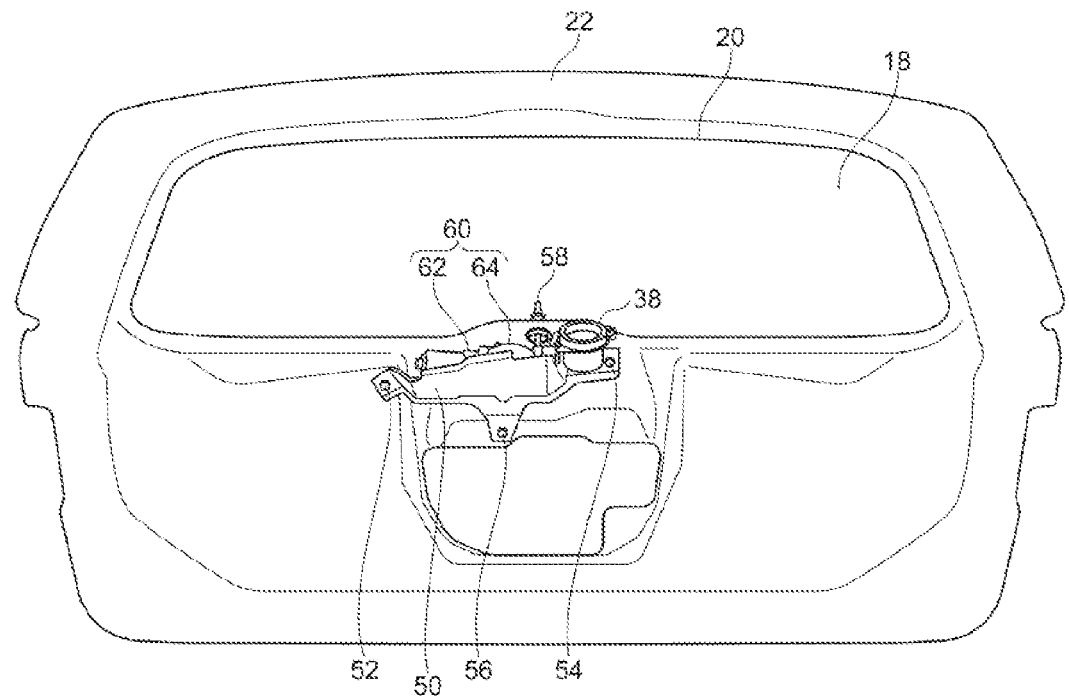
FIG. 4 is a drawing illustrating a structure in which the speaker is attached to a middle part of the back door.

In the embodiment illustrated in FIG. 4, the motor unit 60 is disposed on the left side and the speaker 38 is disposed on the right side of the wiper driving shaft 58 as seen from the inside to the outside of the vehicle so that the weight is balanced as much as possible. Accordingly, vibrations of the motor unit 60 are not amplified by the bracket 50.

Embodiment 2

Figure 5:
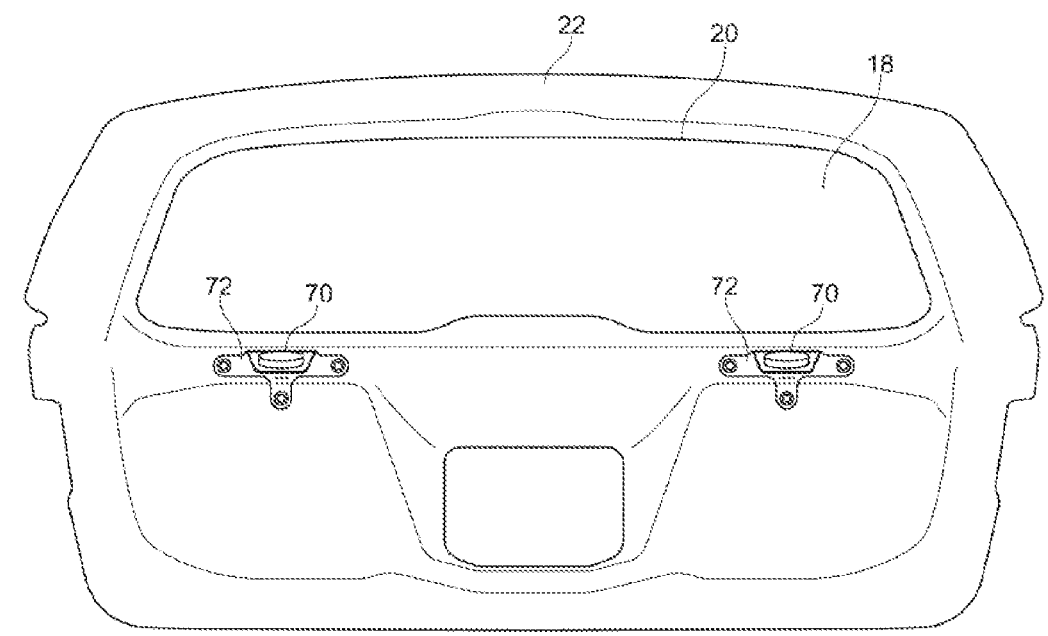
FIG. 5 is a drawing illustrating a structure in which speakers are attached to left and right parts of the back door.

Whereas one speaker is disposed in the middle part in the vehicle width direction in embodiment 1 described above, two speakers 70 are disposed substantially symmetrically in embodiment 2 illustrated in FIG. 5. The individual speakers 70 may be disposed so that the sounds emitted by the speakers 70 are reflected by the back door pane 20 and then transmitted over the rear seat to the front part as described in embodiment 1. The transmission directions of the reflected sounds at this time may be oriented upward of the horizontal plane as described in embodiment 1.

Specifically, in embodiment 2, two brackets 72 are fixed symmetrically or substantially symmetrically to the inner panel 22 and the speakers 70 are fixed to the individual brackets 72. As in embodiment 1, the brackets 72 may be fixed to the inner panel 22 at a plurality of fastening points, for example, at three fastening points. Although not illustrated, speaker openings are formed in the back door trim that covers the inner panel 22 so that the sounds emitted by the speakers 70 are released toward the back door pane 20 through these openings.

Although the back door pane 20 is greatly inclined with respect to the vehicle height direction axis in embodiments 1 and 2 described above, the present application is also applicable even to a vehicle in which the back door pane is oriented in the vehicle height direction or substantially in the vehicle height direction. For example, when the back door pane is oriented in the vehicle height direction, i.e., the vertical direction, or substantially in the vehicle height direction, i.e., substantially in the vertical direction, the speaker may be set so that the sound emitted by the speaker 38 or the speakers 70 is reflected by the back door pane and then oriented to the front part of the vehicle interior by orienting the central axis of the speaker obliquely backward.

(2) Warning System

Figure 6:
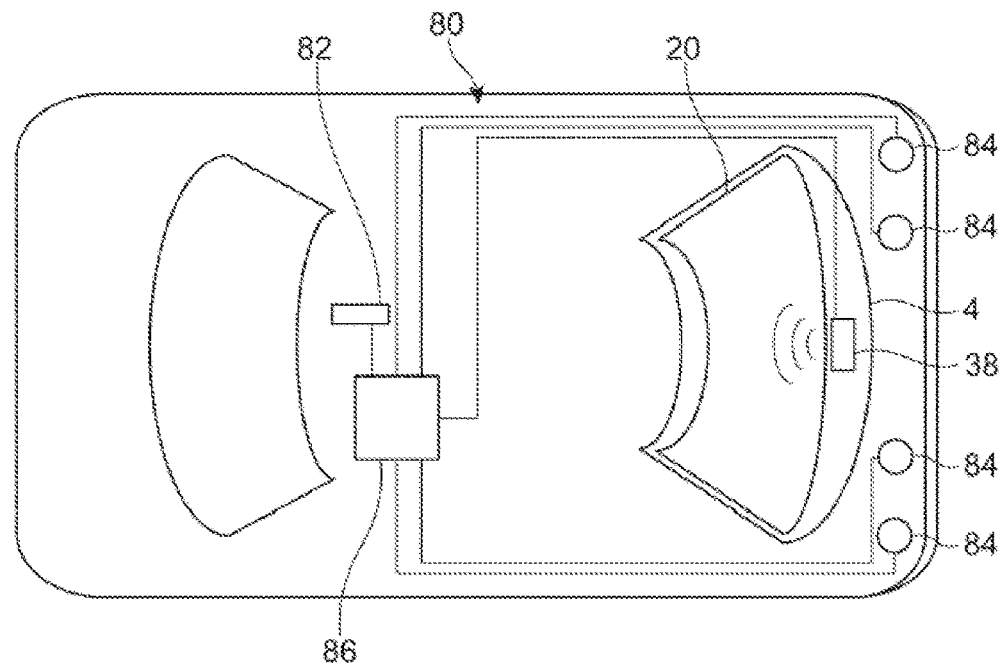
FIG. 6 is a diagram illustrating the structure of a vehicle warning system including a speaker.
Figure 7:
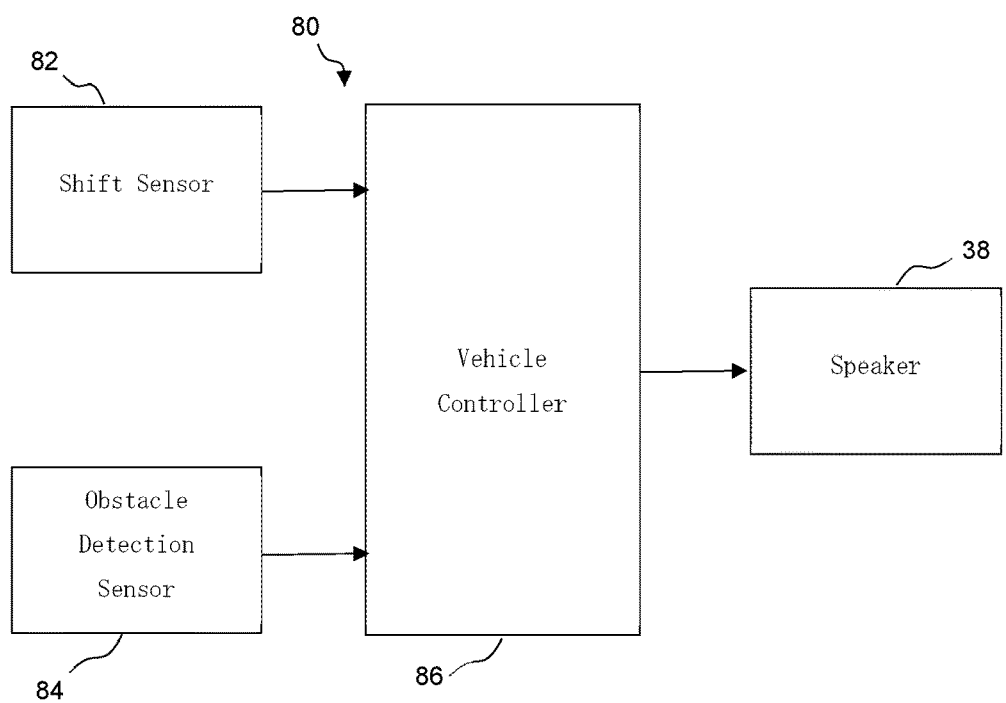
FIG. 7 is a block diagram illustrating the structure of the vehicle warning system illustrated in FIG. 6.

FIGS. 6 and 7 illustrate the structure of a warning system 80 according to the present application. The warning system 80 according to the embodiment illustrated in FIGS. 6 and 7 includes the speaker 38 or the speakers 70 described above, a shift sensor 82 that detects that the shift range is reverse, one or a plurality of obstacle detection sensors 84 installed in the rear part of the vehicle body, and a controller 86 electrically connected to the shift sensor 82 and the obstacle detection sensors 84. The obstacle detection sensors 84 may be of any types that can detect the presence or absence of a rear obstacle or the distance from a rear obstacle.

Figure 8:
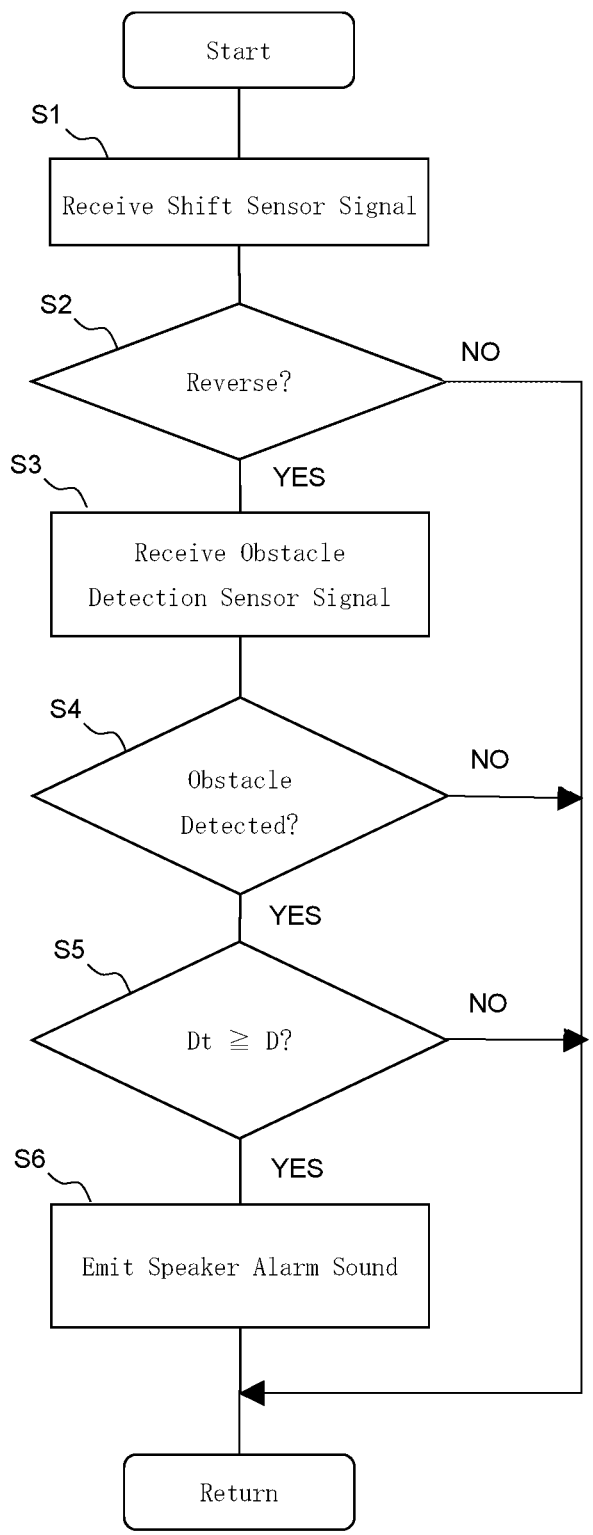
FIG. 8 is a flowchart illustrating the operation of the vehicle warning system illustrated in FIGS. 6 and 7.

In the warning system 80 configured as described above, as illustrated in FIG. 8, the controller 86 receives an output of the shift sensor 82 in step S1, and decides whether the shift position is set in the reverse range in step S2. When the shift position is set in the reverse range, the controller 86 receives outputs of the obstacle detection sensors 84 in step S3 and decides whether an obstacle is present in step S4. When an obstacle is present, the controller 86 decides whether the distance D between the obstacle and the vehicle is equal to or less than a predetermined threshold Dt in step S5. When the distance D is equal to or less than the threshold Dt, the controller 86 emits a predetermined warning sound by driving the speaker 38 in step S6. As described above, the warning sound from the speaker 38 is reflected by the back door pane 20 and is transmitted to the front part of the vehicle interior. Accordingly, the driver can intuitively recognize the presence of an obstacle at the rear by listening the warning sound transmitted from the rear part.

What is claimed is:

1. A vehicle back door comprising:
a back door main body having a window opening formed therein;
a back door pane attached to the back door main body and configured to close the window opening; and
a first speaker attached to the back door main body at a position below the back door pane,
wherein an angle formed by a vehicle height direction of a vehicle and a central axis of the speaker is smaller than an inclination angle of the back door pane with respect to the vehicle height direction.

2. A vehicle back door comprising:
a back door main body having a window opening formed therein;
a back door pane attached to the back door main body and configured to close the window opening; and
a first speaker attached to the back door main body at a position below the back door pane,
wherein a central axis of the speaker is oriented to the back door pane.

3. The vehicle back door according to claim 1,
wherein the first speaker is disposed in a central portion in a vehicle width direction of the back door main body.

4. The vehicle back door according to claim 2,
wherein the first speaker is disposed in a central portion in a vehicle width direction of the back door main body.

5. The vehicle back door according to claim 1,
further comprising a second speaker,
wherein the first and second speakers are spaced apart from each other in a vehicle width direction with a central portion of the back door main body being positioned between the first and second speakers in the vehicle width direction.

6. The vehicle back door according to claim 2,
further comprising a second speaker,
wherein the first and second speakers are spaced apart from each other in a vehicle width direction with a central portion of the back door main body being positioned between the first and second speakers in the vehicle width direction.

7. The vehicle back door according to claim 1,
wherein a sound reflected by the back door pane is oriented upward of a horizontal plane.

8. The vehicle back door according to claim 2,
wherein a sound reflected by the back door pane is oriented upward of a horizontal plane.

9. The vehicle back door according to claim 3,
wherein a sound reflected by the back door pane is oriented upward of a horizontal plane.

10. The vehicle back door according to claim 4,
wherein a sound reflected by the back door pane is oriented upward of a horizontal plane.

11. The vehicle back door according to claim 5,
wherein a sound reflected by the back door pane is oriented upward of a horizontal plane.

12. The vehicle back door according to claim 6,
wherein a sound reflected by the back door pane is oriented upward of a horizontal plane.

* * * * *